United States Patent Office.

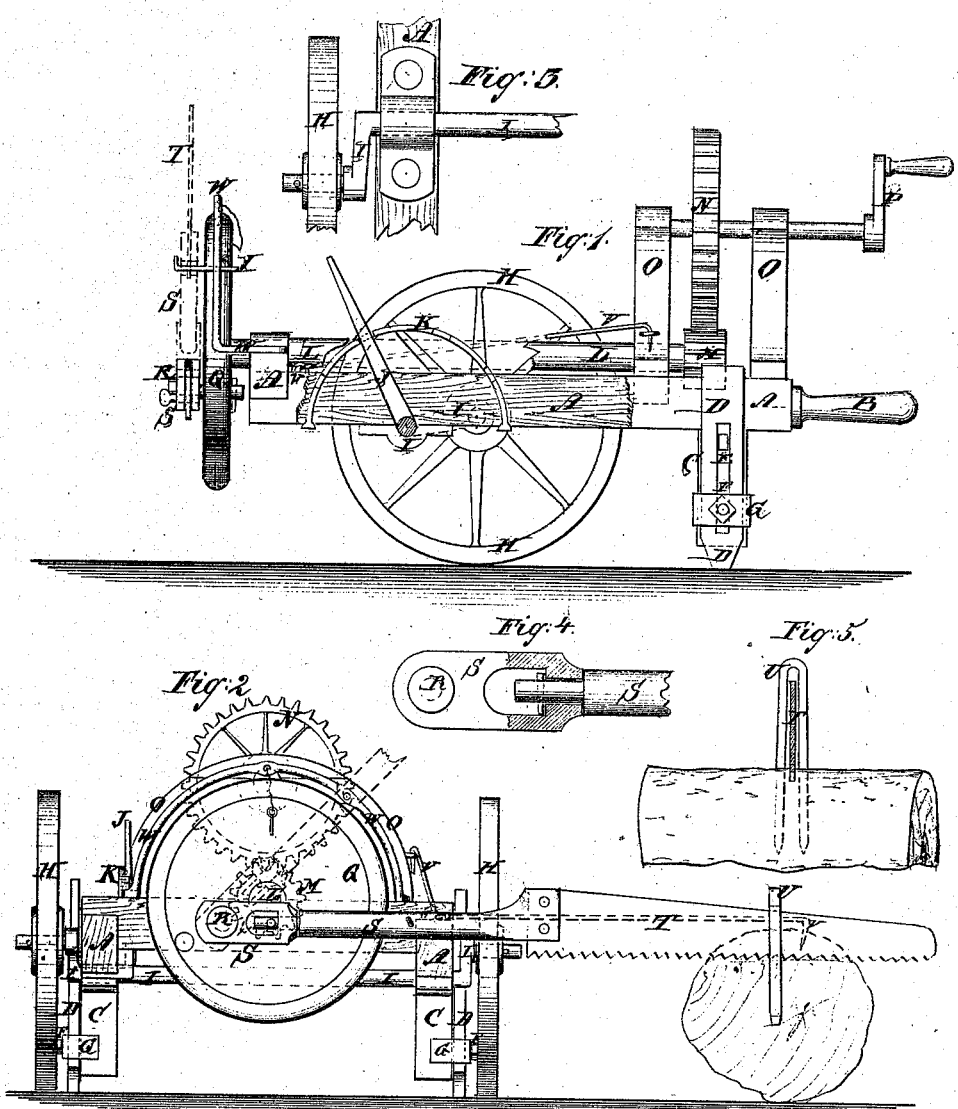

MOSES NEAL CLARK, OF HARRISON CITY, PENNSYLVANIA.

Letters Patent No. 105,647, dated July 26, 1870.

IMPROVEMENT IN SAWING-MACHINE.

The Schedule referred to in these Letters Patent and making part of the same.

*To all whom it may concern:*

Be it known that I, MOSES NEAL CLARK, of Harrison City, in the county of Westmoreland and State of Pennsylvania, have invented a new and useful Improvement in Sawing-Machine; and I do hereby declare that the following is a full, clear, and exact description thereof, which will enable others skilled in the art to make and use the same, reference being had to the accompanying drawing forming a part of this specification, in which—

Figure 1 is a side view of my improved machine, parts being broken away to show the construction.

Figure 2 is front view of the same.

Figure 3 is a detail view, illustrating the construction of the axle.

Figure 4 is a detail view, partly in section, illustrating the construction of the saw-pitman.

Figure 5 is a detail view, illustrating the device for starting the saw straight when entering a log.

Similar letters of reference indicate corresponding parts.

My invention has for its object to furnish a simple, convenient, and effective machine, to be operated by hand-power, for sawing off logs, shingle stuff, and for various other purposes for which a cross-cut saw is generally used; and It consists in the construction and combination of the various parts of the machine, as hereinafter more fully described.

A is the frame of the machine, upon the rear ends of the side bars of which are formed, or to them are attached, handles B, for convenience in moving the machine from place to place.

The rear end of the machine is supported by legs C, the upper ends of which are securely attached to the rear parts of the side bars of the frame A.

Upon the outer side of the legs C are placed bars D, the lower ends of which are sharpened, and the bodies of which are slotted longitudinally to receive the guide-pins E, attached to the legs C, and to receive the bolts F, which pass through the said slotted plates or bars D and through the said legs C.

The bolts F also pass through the keepers G, which surround three sides of the bars D, and the ends of which overlap the sides of the legs C.

The bars D may be driven into the ground to hold the machine steady while being operated. They may also be used for leveling up the machine and adjusting it, as circumstances may require.

The forward part of the machine is supported by wheels H, which revolve upon the journals of the axle I, which works in bearings attached to the side bars of the frame A.

The axle I, at each end, is bent twice at right angles between the side bars of the frame A and the wheels H, so that, by partially revolving the axle I, the forward end of the frame A may be raised and lowered to adjust it as required.

The axle I is turned by the lever J, the lower end of which is secured to the said axle, and which projects upward along the notched edge of the arched bar K, the ends of which are secured to the side bar of the frame A, so that, by catching the lever J in one or another of the notches of the bar K, the forward end of the frame A may be secured at any desired elevation.

L is a shaft, the journals of which revolve in bearings attached to the middle parts of the front and rear cross-bars of the frame A.

To the rear part of the shaft L is attached a gear-wheel, M, the teeth of which mesh into the teeth of the large gear-wheel N, the journals of which revolve in bearings in the upper parts of the arched standards O, the lower ends of which are attached to the frame A.

To the projecting ends of the rear journal of the gear-wheel N is attached the crank P, by means of which power is applied to the machine.

To the forward end of the shaft L is attached a fly-wheel, Q, which should be made sufficiently large and heavy to give steadiness of motion to the saw.

To the fly-wheel Q is attached a crank-pin, R, to which the end of the saw-pitman S is pivoted, several holes being made in the fly-wheel Q for the reception of the crank-pin R, at different distances from the center of said wheel, so that the stroke of the saw may be adjusted at will.

The saw-pitman S is made in two parts; the outer part, to the end of which the saw T is attached, is swiveled to the other parts, as shown in figures 3 and 4.

This construction enables the cut to be made at right angles with the length of the log, however the log may be lying, provided the saw is held securely at the proper inclination while being started into the log. The saw is held in position while being started into the log by the staple U, the arms of which are made parallel with each other, and at such a distance apart as to receive the saw between them, which staple is placed over the saw and driven into the log, as shown in figures 2 and 5.

The frame of the machine and the log are connected to each other by the long dog V, one end of which is pivoted to the forward part of the frame A, and the other, or hooked end, is driven into the log. When not in use, the dog V is hooked into a staple attached to the rear part of the frame A, as shown in figures 1 and 2.

W is a semicircular bar, which passes over the fly-wheel Q, and the ends of which are bent at right angles, and are attached to the front cross-bar of the frame A.

The bar W has one or more holes formed in it to receive the pin or bolt X, that also passes through a hole in the saw-pitman S, to support the said pitman and its attached saw T while moving the machine from place to place.

The lower pin or bolt, by which the saw T is secured to the end of the pitman S, should be so made that it may be easily detached, so that, when the machine is to be moved any considerable distance, the said pin or bolt may be detached and the saw swung back upon the pitman, so as to be entirely out of the way.

The machine, constructed as herein described, can be moved from place to place by one man, in the manner of a hand-cart or wheelbarrow, and may be operated by one man for doing any work that can be done by a cross-cut saw, doing the work a great deal faster.

Having thus described my invention,

What I claim as new, and desire to secure by Letters Patent, is—

1. The combination with legs C of sharpened and slotted bars D, guide-pins E, bolts F, and keepers G, all constructed and relatively arranged as and for the purpose specified.

2. The combination with saw T of detachable guide U and pitman S S, formed in two parts, swiveled together, whereby the saw may be set to cut the log or tree at any angle.

3. The combination of the curved bar W with the frame A and saw-pitman S, substantially as herein shown and described and for the purpose set forth.

MOSES NEAL CLARK.

Witnesses:
   H. P. LAUFFER,
   S. J. MILLER.